(12) United States Patent
Arai et al.

(10) Patent No.: US 10,721,942 B2
(45) Date of Patent: Jul. 28, 2020

(54) OIL AND FAT COMPOSITION

(71) Applicant: J-OIL MILLS, INC., Tokyo (JP)

(72) Inventors: Masahiro Arai, Tokyo (JP); Tsutomu Hanajiri, Tokyo (JP); Yuzo Yamada, Tokyo (JP); Hiroatsu Hagiri, Tokyo (JP)

(73) Assignee: J-OIL MILLS, INC., Tokyo (JP)

( * ) Notice: Subject to any disclaimer, the term of this patent is extended or adjusted under 35 U.S.C. 154(b) by 264 days.

(21) Appl. No.: 14/072,163

(22) Filed: Nov. 5, 2013

(65) Prior Publication Data

US 2014/0065284 A1 Mar. 6, 2014
US 2015/0196041 A9 Jul. 16, 2015

Related U.S. Application Data

(63) Continuation of application No. PCT/JP2012/055165, filed on Mar. 1, 2012.

(30) Foreign Application Priority Data

May 23, 2011 (JP) ................... 2011-114518

(51) Int. Cl.
*A23D 9/04* (2006.01)
*C11C 3/00* (2006.01)

(52) U.S. Cl.
CPC ............. *A23D 9/04* (2013.01); *C11C 3/006* (2013.01)

(58) Field of Classification Search
CPC .................................. A23D 9/04; C11C 3/006
USPC .................................. 426/533, 541, 613, 650
See application file for complete search history.

(56) References Cited

U.S. PATENT DOCUMENTS 5,043,180 A * 8/1991 Haring et al. ............... 426/533

FOREIGN PATENT DOCUMENTS

| CN | 101326993 A | * | 12/2008 |
| EP | 0450672 A1 | * | 10/1991 |
| EP | 0463660 A1 | | 1/1992 |
| JP | 2002084970 A | | 3/2002 |
| JP | 2004173614 A | | 6/2004 |
| JP | 2009089684 A | | 4/2009 |
| WO | 9501106 A1 | | 1/1995 |

OTHER PUBLICATIONS

Artz, William E., Osidacz, Patricia and Coscione, Aline. 2005. Iron Accumulation in Oil During the Deep-Fat Frying of Meat. JAOCS 82(4)249.*
International Search Report, PCT/JP2012/055165, dated Apr. 18, 2012, 3 pages.

* cited by examiner

*Primary Examiner* — Vera Stulii
(74) *Attorney, Agent, or Firm* — Edell, Shapiro & Finnan, LLC

(57) ABSTRACT

An oil and fat composition is provided which can reduce cooked odors without using an additive such as emulsifier. The oil and fat composition includes an oil and fat produced by oxidizing a fresh oil and fat so that a difference in anisidine value before and after the oxidation is 0.5 to 350, and an edible oil and fat. An added anisidine value of the oil and fat composition is 0.07 to 350 and is further calculated by the following formula: added anisidine value=(anisidine value after oxidation−anisidine value before oxidation)× [additive amount (wt. %)].

6 Claims, No Drawings

US 10,721,942 B2

OIL AND FAT COMPOSITION

TECHNICAL FIELD

The present invention relates to an oil and fat composition and, more particularly, the present invention relates to an oil and fat composition which can reduce cooked odors produced during heating.

BACKGROUND

Edible oils and fats such as soybean oil, rapeseed oil, corn oil, sesame oil and palm oil are excellent as heating mediums and are used for cooking such as baking, panfrying and frying fried foods, tempuras or the like. The oil and fat produces specific irritating odors (hereinafter, referred to as "cooked odors") during cooking with heat. When the cooking with heat is carried out in factories or the like, the cooked odors are a relatively slight problem, while, when everyday dishes are cooked in a small space such as supermarket, the cooked odors can be a problem. Since the cases where the cooking is carried out inside of a small store, such as frying at a counter of convenience stores, are recently increasing, it is expected that the cooked odors are increasingly a problem in the future.

In order to overcome the above-mentioned problem, conventionally, high-cost special oil and fat such as high oleic rapeseed oil which does not produce many odors has been mostly used. Further, reduction of cooked odors produced by ordinary oil and fat has been attempted. For example, JP 2002-84970 A discloses an oil and fat composition obtained by adding and dissolving an emulsifier in an amount of 0.1 to 0.5 parts by weight to an edible oil in an amount of 100 parts by weight. JP 2004-173614 A discloses an oil and fat composition obtained by adding an emulsifier with an average molecular weight of 345 or more in an amount of 0.005 to 5.0 parts by weight and a silicone resin in an amount of 0.1 to 10 ppm to an edible oil in an amount of 100 parts by weight. JP 11-127884 A discloses an oil and fat composition wherein cooked odors are reduced due to dispersion of lipolytic enzyme as powder to plant-derived oil and fat at 81 to 130° C. However, in these inventions, the addition of emulsifier or the like changes physical properties of the oil and fat, so that a use range of the oil and fat is limited.

SUMMARY

Accordingly, an object of the present invention is to provide an oil and fat composition which can inhibit cooked odors without using an additive such as an emulsifier.

As a result of extensive examination for achieving the above-mentioned object, the present inventors determined that blending an edible oil and fat with a predetermined amount of oil and fat which is produced by oxidizing a fresh oil and fat in the predetermined range can result in a significant decrease in cooked odors in accordance with the present invention. Namely, the present invention provides an oil and fat composition comprising: an oil and fat which is produced by oxidizing a fresh oil and fat so that a difference in anisidine value before and after the oxidation is 0.5 to 350; and an edible oil and fat, characterized in that added anisidine value calculated by the formula (1) is 0.07 to 350:

added anisidine value=(anisidine value after oxidation−anisidine value before oxidation)×[additive amount (wt. %)]     (1)

Anisidine value of oil and fat refers to a numerical value obtained in accordance with The Standard Methods for Analysis of Fats, Oils and Related Materials (Japan Oil Chemists' Society) "2.5.3-1996 Anisidine value".

As used herein, the term "fresh oil and fat" refers to oil and fat which has never been used for cooking. Further, the term "additive amount" of oxidized oil refers to the weight percentage of oxidized oil and fat to the oil and fat composition.

Peroxide value of the oxidized oil and fat is preferably 1 to 400. Peroxide value of oil and fat refers to a numerical value obtained in accordance with The Standard Methods for Analysis of Fats, Oils and Related Materials "2.5.2.1-1996 peroxide value" described above.

The added anisidine value is preferably 0.2 to 180.

The added anisidine value is more preferably 0.55 to 150.

The present invention also provides a method of producing an oil and fat composition, characterized by blending an edible oil and fat with an oil and fat which is produced by oxidizing a fresh oil and fat so that a difference in anisidine value before and after the oxidation is 0.5 to 350, so that added anisidine value calculated by the formula (1) is 0.07 to 350.

The present invention also provides a method of inhibiting cooked odors of an edible oil and fat, characterized by blending the edible oil and fat with an oil and fat which is produced by oxidizing a fresh oil and fat so that a difference in anisidine value before and after the oxidation is 0.5 to 350, so that added anisidine value calculated by the formula (1) is 0.07 to 350.

It is quite surprising to find that the oil and fat composition of the present invention reduces cooked odors of oil and fat and brings about the same stability as usual. JP 2009-89684 A discloses an oil and fat composition in which a deteriorated oil and fat is blended in order to enhance hydrogenation flavor of an oil and fat. This invention is directed to enhancing hydrogenation flavor of oil and fat. Further, the oil and fat of this invention has no effect of reducing cooked odors as shown in Comparative Examples in the present specification. JP 2007-110984 A discloses a taste-improving agent consisting of a high-boiling component mixture of oxidized oil and fat derived from plants and animals. Although the oil and fat is also oxidized in this invention, it is not directed to blending with an oil and fat. Further, since the oxidized oil and fat is refined with steam distillation or the like, elevation of anisidine value is almost absent. Therefore, the obtained taste-improving agent has no effect of reducing cooked odors of oil and fat. JP 4-229151 A discloses a method of obtaining a flavor compound by heating a fatty acid derivative or the like in the presence of antioxidant. This invention is directed to improving food flavor, and the flavor compound is not blended with an oil and fat. Moreover, in Examples of JP 4-229151 A, heating is performed entirely in the presence of water, so that it is conceivable that elevation of anisidine value in an oil phase is almost absent. JP 8-511691 A discloses a flavoring composition obtained by heating a fatty acid derivative or the like. JP 8-511691 A is directed to add flavor to foods. JP 8-511691 A does not disclose blending with an oil and fat and reducing cooked odors of an added oil and fat. Moreover, in Example of JP 8-511691 A, heating is performed in the presence of water, so that it is conceivable that elevation of anisidine value in an oil phase is almost absent.

The oil and fat composition of the present invention in which a predetermined amount of oxidized oil and fat is blended with a base oil enables significant reduction of conventionally-concerned cooked odors of oil and fat produced during cooking with heat. Therefore, the oil and fat composition of the present invention is most appropriate as an oil and fat composition for deep-fried foods which requires resistance to prolonged heating.

In the oil and fat composition of the present invention, even if the oxidized oil is blended therewith, bad effects such as deterioration of color, elevation of acid value and elevation of viscosity cannot be found. Furthermore, the effect of reducing cooked odors of the oil and fat composition of the present invention continues for a long time. Moreover, it can be expected that the oil and fat composition has effect of reducing light-exposing odors and improved coating appearance having floral form.

DETAILED DESCRIPTION

Hereinafter, an embodiment of the present invention will be described in further detail. In the oil and fat composition of the present invention, an oil and fat which is produced by oxidizing a fresh oil so that a difference in anisidine value becomes specific (hereinafter, will be referred to as "oxidized oil") is blended with an edible oil and fat as base oil (hereinafter, will be referred to as "base oil" or "base oil and fat"). The effect of reducing cooked odors of the present invention is exhibited only by blending a certain oxidized oil with a base oil. This is proved, on the basis of the following comparison of Example 1 with Comparative Example 2, by the fact that an oil and fat which is produced by oxidizing a base oil so that elevation of anisidine value is set to added anisidine value of the oil and fat composition of the present invention has no effect of reducing cooked odors.

As the edible oil and fat (base oil) which is blended in the oil and fat composition of the present invention, oil and fat derived from plants and animals or the like which is generally used as edible oil and fat can be used without particular limitation. For example, edible oil and fat includes rapeseed oil, corn oil, soybean oil, olive oil, sesame oil, palm oil, palm kernel oil, cotton seed oil, coconut oil, rice oil, sunflower oil, beef fat, milk fat, lard, fish oil, microbial extract oil and fat and cacao butter; and transesterified oil, fractionated oil, hydrogenated oil thereof and combination thereof. The edible oil and fat may be used alone or in combination of two or more. Among this, rapeseed oil, soybean oil, palm oil and/or corn oil is preferable.

The source oil and fat of the oxidized oil which is blended in the oil and fat composition of the present invention must be fresh oil. The term "fresh oil" refers to oil and fat which has never been used for cooking. Examples of the source oil and fat are the same as any one of the above exemplary base oil. The source oil and fat of oxidized oil may be the same as or different from the base oil.

Edible oil and fat has a certain anisidine value, even if it is fresh oil. What is important to the present invention is not anisidine value level after the oxidation, but a difference in anisidine value before and after the oxidation of fresh oil (i.e. transfer amount). Hereinafter, "difference in anisidine value before and after oxidation" will be referred to as simply "difference in anisidine value".

The lower limit of difference in anisidine value is 0.5 or more, preferably 0.6 or more and more preferably 0.8 or more. If the lower limit is less than 0.5, the effect of inhibiting cooked odors of the oil and fat composition is not efficiently achieved. On the other hand, the upper limit of difference is 350 or less, preferably 330 or less, more preferably 250 or less and further preferably 120 or less. If the upper limit is more than 350, deterioration odors of oil and fat composition can be produced.

Peroxide value of the oxidized oil and fat is preferably 1 to 400, further preferably 1 to 150 and most preferably 1 to 100.

The oxidation may be performed, for example, by heating the oil and fat at a temperature of 60 to 220° C., preferably 90 to 190° C. It is not always necessary to forcibly contact with air or oxygen. Forcibly feeding of air while stirring enables to produce the oil and fat composition in a further short time. Heating at high-temperature without forcible feeding of air produces the oxidized oil with a large difference in anisidine value and a low peroxide value. Further, by a combination of these operations, flavorous oil and fat can be produced. The time needed for the oxidation depends on treatment temperature and desired difference in anisidine value.

In the oil and fat composition of the present invention, the oxidized oil is blended with the base oil. The composition is adjusted so that added anisidine value calculated by the following formula (1) is 0.07 to 350, preferably 0.2 to 180 and more preferably 0.55 to 150:

added anisidine value=(anisidine value after oxidation−anisidine value before oxidation)×[additive amount (wt. %)]  (1)

If the added anisidine value is less than 0.07, the effect of inhibiting cooked odors of the oil and fat composition is not efficiently achieved. On the contrary, if the added anisidine value is more than 350, deterioration odors of the oil and fat composition can be produced.

The above-mentioned additive amount (wt. %), which is calculated by the formula (1), is usually 0.001 to 10 wt. %, preferably 0.005 to 5.0 wt. %, further preferably 0.01 to 2.0 wt. % and most preferably 0.05 to 2.0 wt. %. If the additive amount is too high, problems, such as fear of significant change in physical properties of the oil and fat composition from physical properties inherent to the base oil and fat; and fear of production of odors specific to early-deteriorated oil and fat, can occur.

In the oil and fat composition of the present invention, except the base oil and the oxidized oil, additives which are usually used in edible oil and fat can be added as appropriate within the range not hindering the effect of the present invention. Example of the additive includes antioxidant such as tocopherol and vitamin C palmitate; emulsifier such as lecithin, glycerine fatty acid ester, sorbitan fatty acid ester, propylene glycol fatty acid ester, sucrose fatty acid ester and polyglycerol fatty acid ester; perfume and the like.

Application example of the oil and fat composition of the present invention includes oil and fat for cooking such as baking, panfrying and deep-frying fried foods, tempuras or the like. Particularly, the oil and fat composition of the present invention is ideal as an oil and fat composition for deep-fried foods which requires resistance to prolonged heating.

EXAMPLES

Hereinafter, the present invention will be described in further detail by Examples and Comparative Examples. However, the present invention is not limited to the following Examples.

Example 1: Oxidized Oil Addition Test

The effect of inhibiting cooked odors of the oil and fat composition of the present invention is exhibited only by adding a small amount of oxidized oil and fat to a base oil. The test for demonstrating the fact was carried out.

First, 250 g of fresh soybean oil with an anisidine value of 2.07 (product name: Daizu Sirasimeyu, manufactured by J-OIL MILLS, Inc.) was poured in a stainless beaker with a capacity of 500 mL, and then the beaker was immersed in an oil bath with a temperature of 134° C. Next, the oil and fat was oxidized by stirring it under heating while blowing air. By varying heating time, two oxidized soybean oils with difference in anisidine value before and after the oxidation of 0.14 and 14.0 were produced.

1 wt. % of the oxidized oil with difference in anisidine value of 14.0 was added to a soybean oil (product name: Daizu Sirasimeyu, manufactured by J-OIL MILLS, Inc.) as base oil to obtain an oil and fat composition of the present invention (added anisidine value: 14.0). The increment in anisidine value of the entire oil and fat composition was 0.14. As a comparative example, oil and fat composition consisting of oxidized oil with difference in anisidine value of 0.14 was prepared. The increment in anisidine value of the oil and fat was also 0.14. Furthermore, the fresh soybean oil was also prepared. The increment in anisidine value of the fresh soybean oil was 0.

8 g of the resulting oil and fat composition or oil and fat was poured in a glass vessel with a capacity of 30 mL, and heated at 180° C. for 40 minutes. Cooked odors and deterioration odors of the heated oil and fat composition or heated oil and fat were evaluated by three specialized panelists. The evaluation criterion is defined as follows.
The Evaluation of Cooked Odors:
5: No cooked odors
4: Few cooked odors
3: A few cooked odors
2: Cooked odors
1: Strong cooked odors
The Evaluation of Deterioration Odors:
5: No deterioration odors
4: Few deterioration odors
3: A few deterioration odors
2: Deterioration odors
1: Strong deterioration odors
An average value was calculated from the evaluations by three panelists and expressed by the following symbols.
The Average Value Symbols:
⊚: 4.0 to 5.0
○: 3.0 to 3.9
Δ: 2.0 to 2.9
x: 1.0 to 1.9
The evaluation results are shown in Table 1.

As shown in Table 1, Comparative Example 2 and Example 1 have the same increment in anisidine value of the entire oil and fat, but cooked odors and deterioration odors of the oil and fat are clearly different. This proves that, only by adding a small amount of the oxidized oil and fat to the base oil according to the present invention, the effect of inhibiting cooked odors of the oil and fat composition is exhibited.

Examples 2 to 9: Test of Changing Oxidized Oil (1)

The oil and fat compositions were prepared by blending oxidized oils which have different oxidized level with the base oil, and the effect of inhibiting cooked odors was examined.

First, 250 g of the above-mentioned fresh soybean oil was poured in a stainless beaker with a capacity of 500 mL, and then the beaker was immersed in an oil bath with a temperature of 134° C. before stirring under heating while blowing air. The soybean oils were sampled by varying time to obtain the oxidized soybean oils with difference in anisidine value as shown in Table 2. Peroxide value of the oxidized soybean oils was measured. The results are shown in Table 2.

1 wt. % of the above-mentioned oxidized soybean oil was added to a palm fractionated oil soft part (iodine value: 67, manufactured by J-OIL MILLS, Inc.) as base oil to obtain oil and fat compositions with added anisidine value as shown in Table 2. For comparative purposes, oil and fat compositions were also prepared by adding 1 wt. % of fresh soybean oil (before oxidation).

8 g of each resulting oil and fat composition was poured in a glass vessel (capacity: 30 mL) and heated at 180° C. for 40 minutes. Evaluation of cooked odors and deterioration odors of the oil and fat by three specialized panelists was performed in the same procedure as in Example 1. The results are shown in Table 2.

TABLE 1

| | Oil and fat composition or oil and fat | Increment in anisidine value of the entire oil and fat | Effect of inhibiting cooked odors | Evaluation of deterioration odors |
|---|---|---|---|---|
| Comparative example 1 | Fresh soybean oil | 0 | X | ⊚ |
| Comparative example 2 | Oxidized oil with difference in anisidine value of 0.14 | 0.14 | X | Δ |
| Example 1 | Oil and fat composition prepared by blending 1 wt. % of the oxidized oil with difference in anisidine value of 14.0 with fresh oil | 0.14* | ⊚ | ⊚ |

*Added anisidine value in the oil and fat composition is 14.

TABLE 2

| | Oxidized soybean oil | | | Oil and fat composition | | |
|---|---|---|---|---|---|---|
| | Oxidation time (min) | Difference in anisidine value | Peroxide value | Added anisidine value | Effect of inhibiting cooked odors | Evaluation of deterioration odors |
| Comparative example 3 | 0 | 0 | 0 | 0 | X | ◎ |
| Comparative example 4 | 20 | 0.36 | 1.4 | 0.36 | X | ◎ |
| Example 2 | 30 | 0.63 | 1.9 | 0.63 | ○ | ◎ |
| Example 3 | 40 | 0.84 | 2.3 | 0.84 | ◎ | ◎ |
| Example 4 | 50 | 1.28 | 2.9 | 1.28 | ◎ | ◎ |
| Example 5 | 60 | 1.56 | 7.0 | 1.56 | ◎ | ◎ |
| Example 6 | 70 | 2.59 | 13.5 | 2.59 | ◎ | ◎ |
| Example 7 | 80 | 4.24 | 20.8 | 4.24 | ◎ | ◎ |
| Example 8 | 100 | 8.71 | 40.0 | 8.71 | ◎ | ◎ |
| Example 9 | 120 | 15.8 | 63.3 | 15.8 | ◎ | ◎ |

As shown in Table 2, in the oil and fat compositions comprising the oxidized oil with difference in anisidine value of 0.63 to 15.8, cooked odors were inhibited. In Comparative Example 4 with too little difference in anisidine value of 0.36, the effect of reducing cooked odors of the oil and fat composition was not observed.

Examples 10 to 18: Test of Changing Oxidized Oil (2)

In the same manner as in Example 2, the oil and fat compositions were prepared by blending oxidized oil with base oil and the effect of reducing cooked odors of the compositions was examined. 250 g of the above-mentioned fresh soybean oil was poured in a stainless beaker, and then the beaker was immersed in an oil bath with a temperature of 134° C. before stirring under heating while blowing air. The soybean oils were sampled by varying time to obtain the oxidized soybean oils with difference in anisidine value as shown in Table 3. The peroxide value of the oxidized soybean oils was measured. The results are shown in Table 3. 1 wt. % of the oxidized soybean oil was added to the above-mentioned palm fractionated oil soft part as base oil to obtain oil and fat composition with added anisidine value as shown in Table 3.

8 g of the above-mentioned oil and fat composition was poured in the above-mentioned glass vessel and heated at 180° C. for 40 minutes. As a comparative example, oil and fat composition prepared by adding 1 wt. % of fresh soybean oil was evaluated according to the same criterion as Example 1. The results are shown in Table 3.

TABLE 3

| | Oxidized soybean oil | | | Oil and fat composition | | |
|---|---|---|---|---|---|---|
| | Oxidation time (min) | Difference in anisidine value | Peroxide value | Added anisidine value | Effect of reducing cooked odors | Evaluation of deterioration odors |
| Comparative example 3 | 0 | 0 | 0 | 0 | X | ◎ |
| Example 10 | 80 | 1.98 | 12.7 | 1.98 | ◎ | ◎ |
| Example 11 | 100 | 5.37 | 29.1 | 5.37 | ◎ | ◎ |
| Example 12 | 120 | 11.7 | 63.1 | 11.7 | ◎ | ◎ |
| Example 13 | 140 | 18.5 | 87.8 | 18.5 | ◎ | ◎ |
| Example 14 | 160 | 27.8 | 119 | 27.8 | ◎ | ◎ |
| Example 15 | 180 | 60.6 | 187 | 60.6 | ◎ | ○ |
| Example 16 | 200 | 130 | 333 | 130 | ○ | ○ |
| Example 17 | 210 | 203 | 412 | 203 | ○ | Δ |
| Example 18 | 220 | 324 | 499 | 324 | Δ | Δ |
| Comparative example 4 | 230 | 450 | 520 | 450 | X | X |
| Comparative example 5 | 240 | 624 | 547 | 624 | —* | X |

*Not be able to evaluate due to the too strong deterioration odors.

As shown in Table 3, in the oil and fat compositions comprising the oxidized oil with difference in anisidine value of 1.98 to 324, cooked odors were inhibited. However, in the cases where the difference in anisidine value was 60.6 or more, slight deterioration odors of the added oxidized soybean oil were observed.

Examples 19 to 38: Test of Changing Oxidized Oil (3)

The effect of inhibiting cooked odors of oil and fat compositions with different blending quantities of oxidized soybean oil was examined. Specifically, in the same procedure as in Example 1, four oxidized soybean oils were obtained (Table 4). The oxidized soybean oils were added to the above-mentioned palm fractionated oil soft part to make added anisidine value as shown in Table 4. Evaluation of cooked odors and deterioration odors of the resulting oil and fat compositions was performed in the same procedure as in Example 1. The results are shown in Table 4.

and 244, even if mere 0.1 wt. % of the oxidized oil was added, the effect of inhibiting cooked odors of the oil and fat compositions was observed.

Examples 39 to 48: Test of Changing Oxidized Oil (4)

The oil and fat compositions were prepared by blending oxidized oils derived from different source oil and fat with a base oil, and the effect of inhibiting cooked odors was examined. Specifically, 30 g of rapeseed oil (anisidine value: 2.94, product name: J-Canola Oil, manufactured by J-OIL MILLS, Inc.), corn oil (anisidine value: 5.69, product name: J-Corn Oil, manufactured by J-OIL MILLS, Inc.), palm fractionated oil soft part (anisidine value: 3.78, iodine value: 67, manufactured by J-OIL MILLS, Inc.), partially hydrogenated soybean oil (anisidine value: 1.17, product name: Daizu suitenshi 20, manufactured by J-OIL MILLS, Inc.) and lard (anisidine value: 2.13, product name: GOLDRING, manufactured by ADEKA Corporation) were each poured in a test tube, and oxidized oils were prepared by heating while

TABLE 4

|  | Oxidized soybean oil | | Oil and fat composition | | | |
|---|---|---|---|---|---|---|
|  | Difference in anisidine value | Peroxide value | Additive amount of oxidized oil (wt. %) | Added anisidine value | Effect of inhibiting cooked odors | Evaluation of deterioration odors |
| Comparative example 6 | 0 | 0 | 0 | 0 | X | ◉ |
| Comparative example 7 | 0.14 | nd* | 5 | 0.7 | X | ◉ |
| Comparative example 8 | 0.14 | nd | 20 | 2.8 | X | Δ |
| Comparative example 9 | 0.14 | nd | 30 | 4.2 | X | X |
| Example 19 | 0.76 | 2.3 | 0.1 | 0.08 | Δ | ◉ |
| Example 20 | 0.76 | 2.3 | 0.3 | 0.23 | ○ | ◉ |
| Example 21 | 0.76 | 2.3 | 0.5 | 0.38 | ○ | ◉ |
| Example 22 | 0.76 | 2.3 | 1.0 | 0.76 | ◉ | ◉ |
| Example 23 | 0.76 | 2.3 | 5.0 | 3.8 | ◉ | ◉ |
| Example 24 | 0.76 | 2.3 | 10.0 | 7.6 | ◉ | ○ |
| Example 25 | 26.6 | 104 | 0.02 | 0.53 | ○ | ◉ |
| Example 26 | 26.6 | 104 | 0.05 | 1.33 | ○ | ◉ |
| Example 27 | 26.6 | 104 | 0.1 | 2.66 | ○ | ◉ |
| Example 28 | 26.6 | 104 | 0.2 | 5.32 | ◉ | ◉ |
| Example 29 | 26.6 | 104 | 0.5 | 13.3 | ◉ | ◉ |
| Example 30 | 26.6 | 104 | 0.8 | 21.3 | ◉ | ◉ |
| Example 31 | 26.6 | 104 | 1.0 | 26.6 | ◉ | ○ |
| Example 32 | 26.6 | 104 | 2.0 | 53.2 | ◉ | ○ |
| Example 33 | 26.6 | 104 | 5.0 | 133 | ○ | Δ |
| Example 34 | 244 | 548 | 0.01 | 2.44 | ○ | ◉ |
| Example 35 | 244 | 548 | 0.1 | 24.4 | ◉ | ◉ |
| Example 36 | 244 | 548 | 0.5 | 122 | ○ | ○ |
| Example 37 | 244 | 548 | 0.8 | 195 | ○ | Δ |
| Example 38 | 244 | 548 | 1.0 | 244 | ○ | Δ |
| Comparative example 10 | 244 | 548 | 1.5 | 366 | Δ | X |
| Comparative example 11 | 244 | 548 | 2.0 | 488 | X | X |

*Not measured.

As shown in Table 4, in the cases where the oil and fat compositions have a low difference in anisidine value before and after the oxidation of 0.14, the effect of inhibiting cooked odors of the oil and fat compositions was not observed. On the other hand, in the cases where oil and fat compositions have difference in anisidine value of 0.76, 26.6 blowing air at a temperature of 98° C. with AOM device (manufactured by Kuramochi Kagaku Kiki Seisakusho, oil and fat stabilizer, A.O.M. measurement device). The difference in anisidine value of the resulting oxidized oils is shown in Table 5. For comparative purposes, the above-mentioned fresh corn oil was prepared.

TABLE 5

| | Added oil and fat | Difference in anisidine value before and after oxidation | Oil and fat composition | | | |
|---|---|---|---|---|---|---|
| | | | Additive amount of oxidized oil (wt. %) | Added anisidine value | Effect of inhibiting cooked odors | Evaluation of deterioration odors |
| Comparative example 12 | Fresh corn oil | — | — | — | X | ◎ |
| Example 39 | Oxidized soybean oil | 0.76 | 0.5 | 0.38 | ○ | ◎ |
| Example 40 | Oxidized soybean oil | 0.76 | 1.0 | 0.76 | ◎ | ◎ |
| Example 41 | Oxidized rapeseed oil | 41.6 | 0.5 | 20.8 | ○ | ◎ |
| Example 42 | Oxidized rapeseed oil | 41.6 | 1.0 | 41.6 | ◎ | ◎ |
| Example 43 | Oxidized corn oil | 10.6 | 0.5 | 5.3 | ○ | ◎ |
| Example 44 | Oxidized corn oil | 10.6 | 1.0 | 10.6 | ◎ | ◎ |
| Example 45 | Oxidized palm fractionated oil soft part | 32.1 | 0.5 | 16.1 | ○ | ◎ |
| Example 46 | Oxidized palm fractionated oil soft part | 32.1 | 1.0 | 32.1 | ◎ | ◎ |
| Example 47 | Oxidized and partially hydrogenated soy bean oil | 13.9 | 1.0 | 13.9 | ◎ | ◎ |
| Example 48 | Oxidized lard | 18.7 | 0.2 | 3.7 | ◎ | ◎ |

In the oil and fat compositions of the present invention prepared by blending the oxidized oil with corn oil as base oil, the effect of inhibiting cooked odors peculiar to corn oil was observed. From the above-mentioned results, it was found that the effect of inhibiting cooked odors of the oil and fat compositions of the present invention was exhibited independent of a type of the base oil and the oxidized oil.

Examples 49 to 54: Test of Changing Oxidizing Condition

The oxidation method performed in Example 1 was changed into a method at higher temperature without blowing air, and the effect of inhibiting cooked odors of the oil and fat compositions obtained by the method was examined. Specifically, 600 g of the above-mentioned soybean oil, the above-mentioned rapeseed oil and the above-mentioned palm fractionated oil soft part were each put in a porcelain dish, and oxidized oils were prepared by heating at a temperature of 180° C. The difference in anisidine value and peroxide value of the resulting oxidized oils are shown in Table 6.

The palm fractionated oil soft part was used as base oil, and oil and fat compositions were prepared by blending the oxidized oil in an additive amount as shown in Table 6. Further, as a comparative example, the above-mentioned palm fractionated oil soft part was used. After heating the above-mentioned oil and fat compositions at 180° C. for 40 minutes, cooked odors and deterioration odors of the oil and fat were evaluated by three panelists. The results are shown in Table 6.

TABLE 6

| | Added oil and fat | | | Oil and fat composition | | | |
|---|---|---|---|---|---|---|---|
| | Type | Difference in anisidine value before and after oxidation | Peroxide value | Additive amount of added oil and fat (wt. %) | Added anisidine value | Effect of inhibiting cooked odors | Evaluation of deterioration odors |
| Comparative example 13 | Palm fractionated oil soft part | — | 0 | — | — | X | ◎ |
| Example 49 | Oxidized soybean oil | 318 | 15.0 | 0.5 | 159 | ◎ | ◎ |
| Example 50 | Oxidized soybean oil | 318 | 15.0 | 1.0 | 318 | ○ | ○ |
| Example 51 | Oxidized rapeseed oil | 197 | 2.1 | 0.5 | 98.5 | ◎ | ◎ |
| Example 52 | Oxidized rapeseed oil | 197 | 2.1 | 1.0 | 197 | ◎ | ○ |
| Example 53 | Oxidized palm fractionated oil soft part | 95.9 | 4.7 | 0.5 | 48.0 | ◎ | ◎ |
| Example 54 | Oxidized palm fractionated oil soft part | 95.9 | 4.7 | 1.0 | 59.9 | ◎ | ○ |

As shown in Table 6, by changing the oxidation into the method at high temperature without blowing air, the difference in anisidine value was enlarged, and the oxidized oils with low peroxide value were obtained. The effect of inhibiting cooked odors of the oil and fat compositions of the present invention in which the oxidized oils were added was observed. Furthermore, it was found that, though the oxidation was excessively-performed as could be expected from the difference in anisidine value, the deterioration odors tended to be weak.

Example 55: Test of Changing Oxidized Oil (5)

JP 2009-89684 A discloses oil and fat compositions in which 1 to 30 wt. % of deteriorated partially hydrogenated oil and fat with peroxide value of 0.04 to 7 is blended. Further, as a comparative example of JP 2009-89684 A, the deteriorated hydrogenated oil and fat with peroxide value up to 10.4 is described. It was checked whether these oil and fat compositions comprising the deteriorated hydrogenated oil and fat corresponds to the present invention or not. First, in order to prepare the partially hydrogenated oil and fat of soybean oil described in JP 2009-89684 A (standard oil), soybean oil was hydrogenated. 30 g of the resulting partially hydrogenated oil and fat was poured in a glass vessel, and was appropriately oxidized while blowing air at a temperature of 98° C. with the above-mentioned AOM device to prepare oil and fat A with peroxide value of 7.1 (corresponds to example of JP 2009-89684 A), oil and fat B with peroxide value of 10.9 (corresponds to comparative example of JP 2009-89684 A) and oil and fat C with peroxide value of 17.0 (the present invention). The measured difference in anisidine value of the oil and fat A to C was respectively 0.29, 0.49 and 0.85. 1 wt. % of the oil and fat A to C were each added to the above-mentioned palm fractionated oil soft part to obtain oil and fat compositions. Cooked odors and deterioration odors of the oil and fat compositions were evaluated in the same procedure as in Example 1. The results are shown in Table 7.

As shown in Table 7, in the oil and fat compositions of comparative examples in which 1 wt. % of the oxidized and partially hydrogenated oil and fat A and B, which correspond to the deteriorated hydrogenated oil and fat described in JP 2009-89684 A, were added to the base oil, the effect of reducing cooked odors was not observed. On the other hand, in oil and fat composition of the present invention in which the oxidized and partially hydrogenated oil and fat C, which was further oxidized, was used, the effect of inhibiting cooked odors was clearly observed.

Examples 56 to 67: Test of Changing Base Oil (1)

In the oil and fat compositions in which the following base oil was used: soybean oil (product name: Daizu Sirasimeyu, manufactured by J-OIL MILLS, Inc.); rapeseed oil (product name: J-Canola Oil, manufactured by J-OIL MILLS, Inc.); corn oil (product name: J-Corn Oil, manufactured by J-OIL MILLS, Inc.); palm fractionated oil soft part (iodine value: 67, manufactured by J-OIL MILLS, Inc.); sesame oil (product name: Jyunsei Goma Abura, manufactured by J-OIL MILLS, Inc.); partially hydrogenated soybean oil (soybean partially hydrogenated oil and fat) (product name: Daizu suitenshi 20, manufactured by J-OIL MILLS, Inc.); and lard (product name: GOLDRING, manufactured by ADEKA Corporation), the effect of inhibiting cooked odors was examined.

1 wt. % of the oxidized soybean oil (difference in anisidine value: 0.76) used in Example 19 was added to the base oils as shown in Table 8 to obtain oil and fat compositions. For comparative purposes, oil and fat compositions were also prepared by adding 1 wt. % of fresh soybean oil (before the oxidation) to the base oils. Cooked odors and deterioration odors of the oil and fat compositions were evaluated. The results are shown in Table 8.

TABLE 7

| | Added oil and fat | Peroxide value | Difference in anisidine value before and after oxidation | Oil and fat composition | | |
|---|---|---|---|---|---|---|
| | | | | Added anisidine value | Effect of inhibiting cooked odors | Evaluation of deterioration odors |
| Comparative example 14 | Oxidized and partially hydrogenated oil and fat A | 7.1 | 0.29 | 0.29 | X | ⊚ |
| Comparative example 15 | Oxidized and partially hydrogenated oil and fat B | 10.9 | 0.49 | 0.49 | X | ⊚ |
| Example 55 | Oxidized and partially hydrogenated oil and fat C | 17.0 | 0.85 | 0.85 | ○ | ⊚ |

TABLE 8

| | Added oil and fat | | | Oil and fat composition | | |
|---|---|---|---|---|---|---|
| | Soybean oil | Difference in anisidine value before and after oxidation | Base oil | Added anisidine value | Effect of inhibiting cooked odors | Evaluation of deterioration odors |
| Comparative example 16 | Fresh oil | — | Soybean oil | — | X | ◎ |
| Example 56 | Oxidized oil | 0.76 | Soybean oil | 0.76 | ◎ | ◎ |
| Comparative example 17 | Fresh oil | — | Rapeseed oil | — | X | ◎ |
| Example 57 | Oxidized oil | 0.76 | Rapeseed oil | 0.76 | ◎ | ◎ |
| Comparative example 18 | Fresh oil | — | Corn oil | — | X | ◎ |
| Example 58 | Oxidized oil | 0.76 | Corn oil | 0.76 | ◎ | ◎ |
| Comparative example 19 | Fresh oil | — | Palm fractionated oil soft part | — | X | ◎ |
| Example 59 | Oxidized oil | 0.76 | Palm fractionated soft oil | 0.76 | ◎ | ◎ |
| Comparative example 20 | Fresh oil | — | Sesame oil | — | X | ◎ |
| Example 60 | Oxidized oil | 0.76 | Sesame oil | 0.76 | ○ | ◎ |
| Comparative example 21 | Fresh oil | — | Partially hydrogenated soybean oil | — | X | ◎ |
| Example 61 | Oxidized oil | 0.76 | Partially hydrogenated soybean oil | 0.76 | ◎ | ◎ |
| Comparative example 22 | Fresh oil | — | Lard | — | X | ◎ |
| Example 62 | Oxidized oil | 0.76 | Lard | 0.76 | ◎ | ◎ |
| Comparative example 23 | Fresh oil | — | Soybean oil/Palm fractionated soft oil(80/20) | — | X | ◎ |
| Example 63 | Oxidized oil | 0.76 | Soybean oil/Palm fractionated soft part (80/20) | 0.76 | ◎ | ◎ |
| Comparative example 24 | Fresh oil | — | Palm fractionated soft oil/Rapeseed oil(50/50) | — | X | ◎ |
| Example 64 | Oxidized oil | 0.76 | Palm fractionated soft part/Rapeseed oil (50/50) | 0.76 | ◎ | ◎ |
| Comparative example 25 | Fresh oil | — | Palm fractionated soft oil/Corn oil (20/80) | — | X | ◎ |
| Example 65 | Oxidized oil | 0.76 | Palm fractionated soft part/Corn oil (20/80) | 0.76 | ◎ | ◎ |
| Comparative example 26 | Fresh oil | — | Soybean oil/Corn oil/Rapeseed oil (50/20/30) | — | X | ◎ |
| Example 66 | Oxidized oil | 0.76 | Soybean oil/Corn oil/Rapeseed oil (50/20/30) | 0.76 | ◎ | ◎ |
| Comparative example 27 | Fresh oil | — | Soybean oil/Corn oil (50/50) | — | X | ◎ |
| Example 67 | Oxidized oil | 0.76 | Soybean oil/Corn oil (50/50) | 0.76 | ◎ | ◎ |

As shown in Table 8, in the oil and fat compositions of the present invention, even if the base oil was different, the effect of inhibiting cooked odors was observed. It was found that, according to the present invention, even if the oxidized oil was added to different oil and fat, odors produced during heating could be significantly inhibited.

Example 68: Test of Changing Base Oil (2)

In the oil and fat compositions of the present invention comprising an animal fat (lard) or a partially hydrogenated oil and fat which is characteristic among vegetable oil and fat, the effect of inhibiting cooked odors was further examined. Specifically, 250 g of the above-mentioned soybean oil was poured in a stainless beaker, and then the beaker was immersed in an oil bath with a temperature of 134° C. before stirring under heating while blowing air to prepare oxidized soybean oil. The difference in anisidine value of the oil and fat was 0.76.

The above-mentioned oxidized soybean oil was added to the above-mentioned lard or the above-mentioned partially hydrogenated soybean oil in the proportion shown in Table 9. Further, as comparative examples, an oil and fat consisting of the above-mentioned lard or the above-mentioned partially hydrogenated soybean oil and fat alone was prepared.

8 g of each resulting oil and fat composition was poured in a glass vessel and heated at 180° C. for 40 minutes. Cooked odors of the oil and fat were evaluated by three specialized panelists. The results are shown in Table 9.

TABLE 9

| | Added oil and fat | | | Oil and fat composition | | |
|---|---|---|---|---|---|---|
| | Type | Difference in anisidine value before and after oxidation | Base oil | Additive amount of oil and fat (wt. %) | Added anisidine value | Effect of inhibiting cooked odors |
| Comparative example 28 | — | — | Lard | — | — | X |
| Example 68 | Oxidized soybean oil | 0.76 | Lard | 0.5 | 0.38 | ○ |
| Example 69 | Oxidized soybean oil | 0.76 | Lard | 1.0 | 0.76 | ⊚ |
| Example 70 | Oxidized soybean oil | 0.76 | Lard | 2.0 | 1.52 | ○ |
| Comparative example 29 | — | — | Partially hydrogenated soybean oil | — | — | X |
| Example 71 | Oxidized soybean oil | 0.76 | Partially hydrogenated soybean oil | 0.5 | 0.38 | ⊚ |
| Example 72 | Oxidized soybean oil | 0.76 | Partially hydrogenated soybean oil | 1.0 | 0.76 | ○ |
| Example 73 | Oxidized soybean oil | 0.76 | Partially hydrogenated soybean oil | 2.0 | 1.52 | ○ |

In the oil and fat compositions of the present invention prepared by adding the oxidized soybean oil to the lard, odors peculiar to lard (raw odor) were inhibited. Further, in the oil and fat compositions of the present invention prepared by adding the oxidized soybean oil to the hydrogenated oil and fat, hydrogenation flavor was inhibited.

Examples 74 to 75: Long-Term Endurance Test of Oil and Fat Composition 1 wt. % of the oxidized soybean oil (difference in anisidine value: 0.76) used in Example 19 was added to the base oils shown in Table 10 to obtain oil and fat compositions. For comparative purposes, 1 wt. % of the fresh soybean oil was added to the base oils shown in Table 10.

600 g of the resulting oil and fat compositions were each put in a porcelain dish, and heated at a temperature of 180° C. Cooked odors of the oil and fat after heating for 10 hours were similarly evaluated by 18 panelists. The results are shown in Table 6.

Examples 76 to 77: Stability Test of Oil and Fat Composition

It was examined whether the addition of the oxidized oil in the oil and fat compositions of the present invention had a bad effect such as quick degradation of oil and fat. Specifically, 1 wt. % of the oxidized soybean oil (difference in anisidine value: 0.76) used in Example 19 was added to the base oils shown in Table 11 (added anisidine value: 0.76) to obtain oil and fat compositions. For comparative purposes, 1 wt. % of the fresh soybean oil was added to the base oils shown in Table 11.

600 g of the resulting oil and fat compositions were each put in a porcelain dish, and heated at a temperature of 180° C. for a total of 40 hours. Color tone, acid value and rate of viscosity rise of the heated oil and fat compositions were analyzed. The methods of color tone analysis and acid value analysis were respectively in accordance with The Standard Methods for Analysis of Fats, Oils and Related Materials (Japan Oil Chemists' Society) "2.2.1.1-1996 colors (Lovibond method)" and "2.3.1-1996 acid value". The viscosity

TABLE 10

| | Added oil and fat | | | Oil and fat composition | |
|---|---|---|---|---|---|
| | Type | Difference in anisidine value before and after oxidation | Base oil | Added anisidine value | Effect of inhibiting cooked odors after 10 hours |
| Comparative example 30 | Fresh soybean oil | — | Soybean oil | — | X |
| Example 74 | Oxidized soybean oil | 0.76 | Soybean oil | 0.76 | ⊚ |
| Comparative example 31 | Fresh soybean oil | — | Rapeseed oil | — | X |
| Example 75 | Oxidized soybean oil | 0.76 | Rapeseed oil | 0.76 | ⊚ |

As shown in Table 10, in the oil and fat compositions of the present invention, after heating for 10 hours, the effect of inhibiting cooked odors was also clearly observed.

measurement was performed with E-type viscometer (TV-20, manufactured by Tokimec Inc.). The results are shown in Table 11.

TABLE 11

|  |  | Comparative example 32 | Comparative example 33 | Example 76 | Example 77 |
|---|---|---|---|---|---|
|  | Base oil | Soybean oil | Rapeseed oil | Soybean oil | Rapeseed oil |
|  | Soybean oil added | Fresh oil | Fresh oil | Oxidized oil | Oxidized oil |
| Color tone | After heating for 0 hour | 8 | 2 | 8 | 2 |
|  | After heating for 10 hours | 16 | 5.2 | 16 | 5.2 |
|  | After heating for 20 hours | 28 | 8 | 28 | 8 |
|  | After heating for 30 hours | 42 | 15 | 42 | 15 |
|  | After heating for 40 hours | 52 | 16 | 52 | 16 |
| Acid value | After heating for 0 hour | 0.05 | 0.04 | 0.05 | 0.05 |
|  | After heating for 10 hours | 0.14 | 0.09 | 0.12 | 0.1 |
|  | After heating for 20 hours | 0.26 | 0.15 | 0.25 | 0.15 |
|  | After heating for 30 hours | 0.37 | 0.22 | 0.37 | 0.22 |
|  | After heating for 40 hours | 0.51 | 0.32 | 0.5 | 0.32 |
| Rate of viscosity rise (%) | After heating for 0 hour | 0 | 0 | 0 | 0 |
|  | After heating for 10 hours | 8.3 | 10.8 | 8.9 | 9.9 |
|  | After heating for 20 hours | 17.1 | 21.7 | 17.5 | 20.2 |
|  | After heating for 30 hours | 25.4 | 33.3 | 25.4 | 31.5 |
|  | After heating for 40 hours | 33.6 | 47.3 | 34.1 | 45.1 |

As shown in Table 11, color tone, acid value and rate of viscosity rise of the oil and fat compositions of the present invention were all comparable to the comparative examples in which the oxidized oil was not added. In other words, it was proved that stability of the oil and fat compositions in which the oxidized oil was blended was not lost.

Examples 78 to 81: Light-Exposing Odors Reduction Test of Oil and Fat Composition The light-exposing odors reduction test of the oil and fat composition of the present invention was performed. Specifically, 20 g of the above-mentioned soybean oil was poured in a test tube and was oxidized while blowing air at a temperature of 98° C. with the above-mentioned AOM device. The resulting oxidized oil had a difference in anisidine value of 70.1 and a peroxide value of 180. The oil and fat compositions of the present invention were prepared by blending the oxidized soybean oil with the fresh soybean oil in the proportion shown in Table 12. For comparative purposes, fresh soybean oils were prepared.

90 g of the resulting oil and fat compositions were poured in a glass vessel with a capacity of 100 mL. After sealing, the vessel was put in a bright place box at a temperature of 24° C. and was irradiated with light of 1500 lux for a maximum of 10 days. Further, in the case where the exposure was not performed, the vessel was put in a dark place at a temperature of 24° C. The light-exposing odors were measured with the following evaluation criterion.

⊚: No light-exposing odors
○: A few light-exposing odors
Δ: Light-exposing odors
x: Strong light-exposing odors The results are shown in Table 12.

TABLE 12

|  | Added oil and fat | | | Oil and fat composition | | | | |
|---|---|---|---|---|---|---|---|---|
|  | Type | Difference in anisidine value before and after oxidation | Base oil | Additive amount of oil and fat (wt. %) | Added anisidine value | Light exposure | Light-exposing odors (day 7) | Light-exposing odors (day 10) |
| Comparative example 34 | — | — | Soybean oil | 0 | — | Not performed | ⊚ | ⊚ |
| Comparative example 35 | — | — | Soybean oil | 0 | — | Performed | X | X |
| Example 78 | Oxidized soybean oil | 70.1 | Soybean oil | 0.5 | 35.1 | Not performed | ⊚ | ⊚ |
| Example 79 | Oxidized soybean oil | 70.1 | Soybean oil | 1.0 | 70.1 | Not performed | ⊚ | ⊚ |
| Example 80 | Oxidized soybean oil | 70.1 | Soybean oil | 0.5 | 35.1 | Performed | Δ | Δ |
| Example 81 | Oxidized soybean oil | 70.1 | Soybean oil | 1.0 | 70.1 | Performed | ○ | ○ |

As shown in Table 12, in the oil and fat compositions of the present invention, the light-exposing odors peculiar to soybeans were reduced.

Example 82: Coating Appearance Having Floral Form Test of Oil and Fat Composition The coating appearance having floral form test of the oil and fat composition of the present invention was performed.

Specifically, 20 g of the above-mentioned corn oil was poured in a test tube and oxidized corn oil was prepared by heating while blowing air at a temperature of 98° C. with the above-mentioned AOM device. The difference in anisidine value of the resulting oxidized oil was 10.6.

1 wt. % of the oxidized corn oil was added to corn oil as base oil to prepare 600 g of oil and fat composition. The oil and fat composition had an added anisidine value of 10.6. As a comparative example, the above-mentioned fresh corn oil was prepared.

Sweet potatoes cut into 1 cm thick in round slices were dipped in a batter liquid, and then sweet potato tempuras were deep-fried with the oil and fat composition heated at a temperature of 180° C. The measurement results of coating appearance having floral form and taste of sweet potato tempuras are shown in Table 13.

TABLE 13

| | Splash of coating | Evaluation of sweet potato tempura (coating appearance having floral form) | Evaluation of sweet potato tempura (taste) |
|---|---|---|---|
| Comparative example 36 | Normal | Normal | Normal |
| Example 82 | Good | Good | Sweet |

As shown in Table 13, in the oil and fat composition of the present invention, a coating was greatly splashed in oil and coating appearance having floral form of tempuras was improved. Also, the taste of sweet potato tempuras was sweet.

The oil and fat after deep-frying sweet potato tempuras was continuously heated at a temperature of 180° C. for 3 hours, strength of total odors and strength of irritating odors were evaluated. The evaluation criterion of strength of total odors was defined as follows.
◉: Few odors
○: A few odors
Δ: Odors
x: Strong odors The evaluation criterion of irritating odors was defined as follows.
◉: Few irritating odors
○: A few irritating odors
Δ: Irritating odors
x: Strong irritating odors The strength of total odors and the strength of irritating odors are shown in Table 14.

TABLE 14

| | Strength of total odors | | Strength of irritating odors | |
|---|---|---|---|---|
| | 1 hour later | 3 hours later | 1 hour later | 3 hours later |
| Comparative example 36 | Δ | X | Δ | X |
| Example 82 | ○ | ○ | ◉ | ○ |

As shown in Table 14, it was found that, in the oil and fat composition of the present invention, divergence of various odors was inhibited as compared to the comparative example.

What is claimed:

1. A method of producing an oil and fat composition, consisting of:
    oxidizing a fresh oil and fat by an oxidation process to produce an oxidized oil and fat, the oxidizing process consisting of heating only the fresh oil and fat for a selected time period with or without the addition of air or oxygen, wherein the selected time period of heating is adjustable to obtain a difference in anisidine value before and after the oxidation in a range from 0.5 to 350; and
    blending a fresh edible oil and fat with the oxidized oil and fat to obtain the oil and fat composition with an added anisidine value that is in a range of 0.07 to 350, wherein the added anisidine value is calculated by the following formula:

added anisidine value=(anisidine value after oxidation−anisidine value before oxidation)×[additive amount (wt. %)], and the additive amount of the oxidized oil and fat is 0.001 to 10 wt. %.

2. The method according to claim 1, wherein the fresh oil and fat is oxidized under forcible contact with oxygen while stirring by blowing air or oxygen into the fresh oil and fat.

3. A method of improving sweetness of deep-fried foods cooked with an edible oil and fat, consisting of:
    blending only a fresh edible oil and fat with an oil and fat which is produced by oxidizing a fresh oil and fat with or without the addition of air or oxygen so that a difference in anisidine value before and after the oxidation is 0.5 to 350, such that an added anisidine value is 0.07 to 350 to obtain a fat and oil composition;
    wherein the added anisidine value is calculated by the following formula:

added anisidine value=(anisidine value after oxidation−anisidine value before oxidation)×[additive amount (wt. %)], and the additive amount of the oxidized oil and fat is 0.001 to 10 wt %; and
    cooking deep-fried foods with the oil and fat composition.

4. The method according to claim 3, wherein the fresh oil and fat is oxidized under forcible contact with oxygen while stirring by blowing air or oxygen into the fresh oil and fat.

5. The method according to claim 1, wherein the fresh oil and fat is oxidized until a peroxide value of the oxidized oil and fat is between 63.1 and 400.

6. The method according to claim 3, wherein the fresh oil and fat is oxidized until a peroxide value of the oxidized oil and fat is between 63.1 and 400.

* * * * *